United States Patent
Fleck et al.

(10) Patent No.: US 6,728,354 B1
(45) Date of Patent: Apr. 27, 2004

(54) METHODS AND DEVICES FOR OUTPUTTING AUDIO ANNOUNCEMENTS USING CID RELATED AND OTHER REFERENCE PARAMETERS

(75) Inventors: Donald Alfred Fleck, Emmaus, PA (US); James A. Johanson, Macungie, PA (US); Philip David Mooney, North Wales, PA (US)

(73) Assignee: Agere Systems, Inc., Allentown, PA (US)

(*) Notice: Subject to any disclaimer, the term of this patent is extended or adjusted under 35 U.S.C. 154(b) by 0 days.

(21) Appl. No.: 09/271,254

(22) Filed: Mar. 17, 1999

(51) Int. Cl.[7] .................................................. H04M 3/42
(52) U.S. Cl. ............................. 379/142.06; 379/88.21; 379/373.02; 379/374.02
(58) Field of Search ............................. 379/67.1, 88.01, 379/88.04, 88.16, 88.19, 88.2, 88.21, 88.22, 142.01, 142.02, 142.04, 142.06, 373.01, 373.02, 373.03, 373.04, 374.02, 375.01, 142.09, 142.18

(56) References Cited

U.S. PATENT DOCUMENTS

| | | | | |
|---|---|---|---|---|
| 5,511,111 A | * | 4/1996 | Serbetcioglu et al. | |
| 5,526,406 A | * | 6/1996 | Luneau | 455/563 |
| 5,727,045 A | * | 3/1998 | Kim | |
| 5,745,562 A | * | 4/1998 | Penning | 379/215.01 |
| 5,764,747 A | * | 6/1998 | Yue et al. | 379/211.03 |
| 5,850,435 A | * | 12/1998 | Devillier | |
| 5,875,232 A | * | 2/1999 | Wolf | |
| 5,883,942 A | * | 3/1999 | Lim et al. | 379/142.01 |
| 5,903,628 A | * | 5/1999 | Brennan | 379/88.21 |
| 5,907,605 A | * | 5/1999 | Ramirez et al. | |
| 5,999,599 A | * | 12/1999 | Shaffer et al. | 379/93.23 |
| 6,044,148 A | * | 3/2000 | Bleile | 379/375 |
| 6,072,859 A | * | 6/2000 | Kong | 379/88.16 |
| 6,108,630 A | * | 8/2000 | Kuechler et al. | 704/240 |
| 6,178,230 B1 | * | 1/2001 | Borland | 379/67.1 |
| 6,178,232 B1 | * | 1/2001 | Latter et al. | 379/88.21 |
| 6,269,152 B1 | * | 7/2001 | Jurinski et al. | 379/76 |
| 6,332,021 B2 | * | 12/2001 | Latter et al. | 379/142.01 |
| 6,385,303 B1 | * | 5/2002 | Peterson et al. | 379/67.1 |

* cited by examiner

Primary Examiner—Scott L. Weaver
(74) Attorney, Agent, or Firm—Harness, Dickey & Pierce, P.L.C.

(57) ABSTRACT

Telephones, telephone answering devices ("TADs") or larger systems are equipped to output audio announcements which identify the sources of incoming calls by comparing caller identity ("CID") data and ring cadence signals in an incoming call with reference parameters. If a match occurs an audio announcement is output. Customized audio announcements may be recorded by a caller so they may be played back as a way of announcing incoming calls or as a greeting. The announcements are stored voices of callers who have originated incoming calls.

130 Claims, 4 Drawing Sheets

METHODS AND DEVICES FOR OUTPUTTING AUDIO ANNOUNCEMENTS USING CID RELATED AND OTHER REFERENCE PARAMETERS

BACKGROUND OF THE INVENTION

Devices which are capable of displaying CID information make it possible to identify by name and telephone number, the source of an incoming call or message. Traditionally, received CID information regarding the source of a message is visually displayed on a display connected to a device capable of detecting the CID information.

If a user of such a device happens to be in front of the display when a call is received, it is easy for her to determine the source of the incoming call. Many times, however, users are not close to the device when a call is received.

It would be advantageous to provide improved devices and methods which would enable users to receive information concerning the source of an incoming call without the need to be in close proximity to the display.

Accordingly, it is an object of the present invention to provide for devices which output audio signals or announcements to identify sources of incoming calls.

It is another object of the present invention to provide for methods of outputting audio signals or announcements to identify sources of incoming calls.

It is a further object of the present invention to provide for programmed devices used to output audio signals or announcements which identify sources of incoming calls.

Other objectives, features and advantages of the present invention will become apparent to those skilled in the art from the following description taken in conjunction with the accompanying drawings.

SUMMARY OF THE INVENTION

The present invention provides for devices, methods and programmed devices which output audio announcements to help a recipient of an incoming call to more easily learn the identity of the caller. An advantage offered by the present invention is the ability to output announcements in the voice of the caller. A second advantage of the present invention is the ability to output these announcements making use of CID information embedded in an incoming signal. A third advantage is the ability to locally or remotely input these "caller" announcements along with other data.

In accordance with embodiments of the present invention there are provided devices for outputting audio signals to identify the source of incoming signals. These devices may comprise a telephone, TAD, PBX or part of a communications central office. These devices may additionally comprise: a receiver or receiving means for receiving an incoming signal; a comparator or comparator means for comparing the incoming signal to lists of reference parameters; and an output unit or output means for outputting at least one audio signal associated with a list of reference parameters when the received incoming signal matches reference parameters of the list.

The incoming signals may comprise incoming telephone calls, CID data or ring cadence signals.

The output unit or means may be adapted to output an audio signal associated with a list of reference parameters when the CID data or ring cadence signals in the incoming signal matches reference parameters of a list.

The output unit or means may be further adapted to output: an outgoing message ("OGM") signal associated with a list of null parameters when CID data is blocked; an audio announcement associated with a list of null parameters when CID data is blocked; an OGM message signal to prompt input of a caller announcement audio signal when the incoming signal does not match reference parameters of a list; an OGM message signal to prompt the input of a caller announcement audio signal when no audio signal is associated with reference parameters which match the incoming signal; a caller announcement audio signal which has been input; and a default audio signal when no caller announcement audio signal is input.

The audio signals, OGM message signals, audio announcements and caller audio announcement signals may be stored in an audio signal memory while the reference parameters may be stored in a list memory or memories.

The output unit or means may still be further adapted to output an audio signal instead of a standard ring, between rings in the incoming signal or in conjunction with a distinct tone.

The audio announcements and lists of reference parameters may be input locally, for instance by a speed dial device, or remotely.

Many of the features and functions of the devices outlined above may be programmed into a device. The present invention, therefore, also envisions programmed devices for outputting audio signals to identify the source of incoming signals along the same lines just described.

The advantages and improvements envisioned by the present invention are not limited, however, to the devices or programmed devices described above; any number of methods comprising the methodologies which make up the devices just described may be used to realize the advantages of the present invention.

In all of the devices, programmed devices and methods mentioned above the audio signals and caller announcement audio signals may comprise audio announcements in the voices of callers and the default audio signals may comprise audible rings.

The present invention and its advantages can be best understood with reference to the drawings, detailed description of the preferred embodiments and claims that follow.

DETAILED DESCRIPTION OF THE INVENTION

The present invention can best be described by referring to a number of examples. These examples will illustrate the features of the present invention, but in no way are intended to limit the scope of the present invention.

Figure 1:
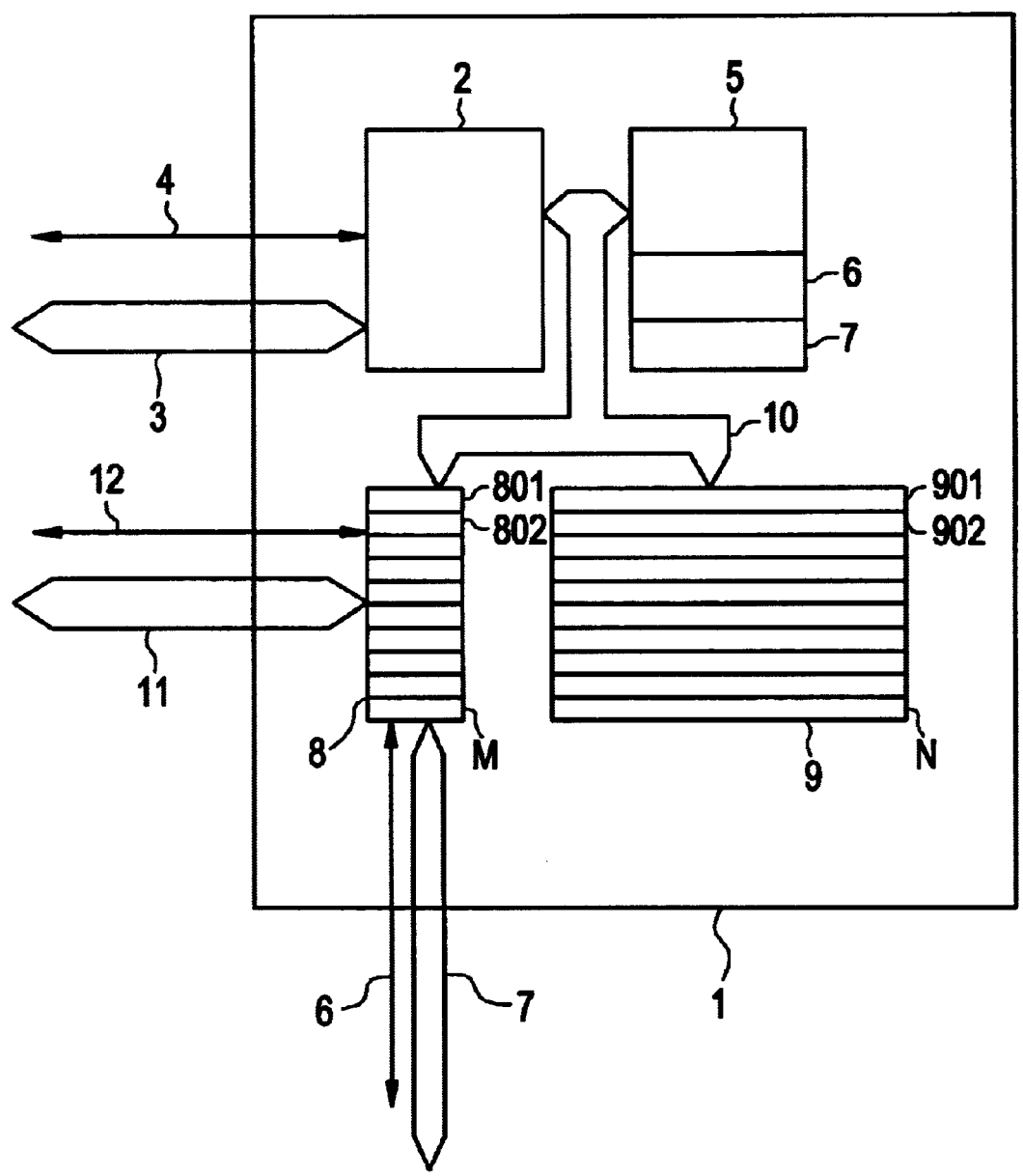
FIG. 1 depicts a device for outputting audio signals to identify the source of incoming signals according to an embodiment of the present invention.

One example, or embodiment, of the present invention is shown in FIG. 1.

A device 1, which may comprise a TAD with CID capability, a telephone, computer, some part of a TAD, telephone, or computer or a part of a communications central office or the like is shown in FIG. 1. As shown, device 1 receives incoming signal 3,4.

The following explanation will focus on the reception of a single "call" to make the explanation as understandable as possible. It should be understood, however, that device 1 is capable of receiving more than one call and that the present invention envisions the reception of multiple incoming calls. In addition, the present invention envisions two different types of scenarios. The first scenario assumes that data has been stored in the device 1 which will help determine the source of incoming signal 3,4. The second scenario involves the situation where data has not yet been stored in the device. In the description which follows, reference will be made to a "near end" or a "far end". Near end refers to the location of device 1 and far end refers to the location of a source of incoming signal 3,4.

The incoming call 3,4 may comprise a number of signals. In the case where the incoming signal is a telephone call these signals may comprise an aural carrier and signals which represent a human voice, a CID data stream and ring cadence signals. It should be understood, however, that the incoming signal 3,4 may comprise any number of signal types: aural, facsimile, e-mail or another data signal. The ring cadence signals contained in the incoming signals 3,4 may originate at a far end telephone central office or may originate from another device located at the near end designed to intercept original ring cadence signals from a central office and output one or more near end ring cadence signals. The device 1 may be connected to such a device or may be a part of a device which comprises such a device.

Returning to FIG. 1, an incoming signal 3,4 from a far end caller is received by receiver or receiving means 2. In one embodiment of the invention, a CID data stream, which identifies the source, e.g., caller, of incoming call 3,4, is received in between first and second "rings" of the incoming signal 3,4 though the present invention is not limited to this sequence. As is known in the art, the reception of the CID data stream between successive rings is known as a "type 1" CID transmission scheme. It should be understood that there are other schemes for receiving the CID data stream besides those that receive a CID data stream between successive rings, each of which can be utilized and still realize the advantages offered by the present invention. Continuing, the receiver 2 may additionally comprise a transmitter, transceiver or transmitting means as well.

The CID data and ring cadence signals in received, incoming call 3,4 are then compared to reference parameters which are a part of lists 901-N. In one embodiment of the present invention, the lists comprise user defined data or reference parameters selected from the group consisting of name, telephone number and ring cadence or from a group comprising a combination of parameters consisting of the same three parameters. The first two parameters are closely related to the type of CID data typically transmitted in a telephone call, and may be referred to as "CID related reference parameters" for short. The purpose of comparing the CID data received in incoming call 3,4 to the lists of reference parameters 901-N is to determine if the CID data matches any of the parameters in lists 901-N. If a match occurs, then device 1 outputs at least one audio signal 801-M. In one embodiment, each of the lists 901-N contains a unique set of reference parameters linked to a unique audio signal or announcement 801-M.

In one embodiment of the present invention the audio signals 801-M are audio announcements which may be heard by the near end user or customer of device 1. So, if a user is not close enough to device 1 to visually view a display (not shown) of CID information, she may nonetheless hear one or more audio announcements which will tell her the source of, or otherwise identify, incoming call 3,4. In one embodiment of the invention each audio announcement 801-M comprises the voice of the caller who originated incoming call 3,4. In this manner the CID data in incoming signal 3,4 is used to output audio announcements which have been "customized" by the callers themselves.

The audio signals or announcements may be stored in an audio announcement unit or announcement means 8 which may further comprise audio signal memory or memory means. The lists of reference parameters 901-N may be stored in a list memory or memory means 9. Memories 8 and/or 9 may or may not be a part of device 1. In one embodiment of the present invention memories 8 and 9 are a part of device 1. The memories 8 and 9 may be a permanent, read-only memory or temporary random access memory.

The announcement means 8 may further comprise an output unit or means for outputting the audio signals or announcements 11,12. Unless otherwise indicated, all of the audio announcements described in the examples above and those that follow may be output using the output unit 8. In one embodiment of the invention the output unit 8 is further adapted to output at least one audio announcement signal 11,12 associated with a list 901-N of reference parameters when CID data in the incoming signal 3,4 matches parameters of a list 901-N.

An example will illustrate the operation of an embodiment of the present invention. Suppose there is an incoming call 3,4 which is received by device 1. The receiver 2 detects the CID data contained in the call 3,4 using techniques known to those in the art. The CID data indicates that the call 3,4 is from "Bill Smith" whose telephone number is "610-123-4567". The device 1 compares the received CID data to lists 901-N. If list 902 comprises a name parameter, in particular, the name "Bill Smith" and a telephone number parameter, more specifically, "610-123-4567" then a match has occurred. Each of the lists 901-N is associated or "linked" to audio signals or announcements 801-M. Because a match was found with list 902, the audio announcement 802 associated with list 902 is output to the near end device 1. Audio announcement 802 is an announcement in Bill Smith's voice, for instance, an announcement which indicates "Hi, this is your friend Bill Smith calling". As indicated above, in one embodiment of the present invention all of the audio announcements comprise voices of callers situated at far end locations which were recorded from a prior call.

The audio signals 801-M may comprise complete audio announcements, e.g. "Hi, this is your friend Bill Smith calling" or may comprise signals which may be used to initiate or generate complete messages. These audio signals may be sent to external devices, such as audio amplifiers or audio speakers which in turn generate the actual audio sounds heard by the user of device 1. The device 1 may also comprise these external devices as well. Two different types of audio signals 801-M may be stored in memory 8; "audio announcements" and "outgoing messages 11" ("OGMs"). An audio announcement or signal 11,12 is an audible signal output to a near end user of device 1. An OGM 3,4 is an audible signal output to a far end caller.

It should be understood that the comparisons described above may be carried out by control/comparator or control/comparator means 5 which receives the reference parameters which comprise lists 901-N and CID data contained in input signal 3,4 via internal bus or pathway 10. In one embodiment of the invention, the comparator 5 compares the incoming signal, and in particular the CID data, with the lists 901-N of reference parameters to determine if there is a match. Given the present functional description of comparator 5 it can be readily created by one of skill in the art using well-known electronics and algorithmic steps and need not be described here in detail.

The examples discussed above assume that both the lists of reference parameters 901-N and audio announcements 801-M have already been input into memories 8 and 9. In alternative embodiments of the present invention, the device 1 comprises features which are triggered in the event that no lists of reference parameters and/or audio announcements are stored in device 1. In some instances, the lists have been stored, but not the announcements.

The audio announcements and lists of reference parameters may be entered remotely or locally. Embodiments which comprise the remote input of this information will be discussed first.

In an alternative embodiment, under this set of circumstances, the device 1 will not contain reference parameters 901-N which will match the incoming signal 3,4 because the device 1 has never received the CID data from a particular caller before. In this embodiment, all of the CID reference parameters stored in list memory 9 are taken from incoming signals 3,4. In addition, because the caller has never called device 1 before, audio signal memory 8 will not contain an announcement 801-M in the caller's voice. Both must be received from this new caller for the first time.

To back track a little, each time device 1 receives an incoming call 3,4 the CID data is compared to CID data which is embedded in the reference parameters of lists 901-N. If there is a match the device 1 operates as described before. In this instance there is no match. The device 1 then will store the new caller CID data embedded in incoming call 3,4 in memory 9 for future use. In addition to outputting announcements to near end users of device 1, the output unit 8 may be adapted to output an OGM, 801-M, along pathways 3,4 in order to prompt the far end caller to input a caller announcement audio signal in the caller's own voice. Once the device 1 has received the caller announcement it will be stored as an audio signal 801-M in audio signal memory 8. The device 1 has now stored two new values; the new caller CID data and new caller announcement audio signal which is associated with it. Henceforth, in the future each time this "new" caller calls device 1 a match will occur and the caller announcement audio signal 11,12 will be output or played back for the user or customer of device 1.

In another embodiment, output unit 8 is further adapted to output the just stored caller announcement audio signal for the first time as soon as the announcement is stored in audio signal memory 8.

We will use Bill Smith again to help illustrate an example of the device just described. Bill has never called device 1 before. He now decides to do so and places a call which is received as an incoming signal 3,4 by device 1. The comparator 5 retrieves the CID data embedded in Bill's call which identifies Bill by name and gives his telephone number (or the number Bill is using to make the call). The comparator also retrieves reference parameters from lists 901-N and compares these to the CID data. Because Bill has never called before no match is found. Next, the device 1 sends an OGM message along transmitter 2 and pathways 3,4 to Bill, such as "Please input a greeting to announce your message", to prompt Bill into inputting an announcement, such as "Hi, this is your friend Bill Smith calling". This announcement is stored in memory 8.

As indicated before, the audio announcements and reference parameters may also be entered into device 1 via some means local to device 1.

So far, the first two examples have relied on creation of the list of reference paraments 901-N by extracting CID data and audio announcements 801-M from incoming signal 3,4 and by remote input of the announcements 801-M. In the first example, the lists 901-N were assumed to be already created; in the second example a list was created when Bill Smith called in for the first time. In both examples, an audio announcement 801-M was input by a far-end caller.

The present invention, however, is not limited to situations where the lists 901-N are created solely from incoming signal 3,4 and the announcements 801-M are remotely input. To the contrary, the lists 901-N and announcements 801-M may be created by a number of means.

The present invention envisions additional embodiments where the lists 901-N are input locally by a near end user of device 1. For example, a user may input the telephone numbers and names of her closest friends as reference parameters in list memory 9. Thereafter, upon receiving an incoming signal 3,4 for the first time from one of these friends comparison unit 5 would detect a match between the CID data in signal 3,4 and reference parameters stored in a list 901-N. However, because the caller has never actually called the device 1 before, no audio announcement in the caller's voice exists in memory 8. If one of her friends is Bill Smith, the output unit 8 is adapted to output an OGM message 3,4, where, as before, Bill Smith is prompted to enter an announcement in his own voice. In one embodiment the output unit 8 will then output an announcement 11,12 which was input into the near end device 1, such as "My best friend Bill Smith is calling".

In yet another embodiment, the far-end caller may sometimes be located close to the near-end device 1. Suppose, for example, Bill Smith visits a user of device 1. While he is visiting, the user asks Bill to input his telephone number into the lists 901-N and also asks Bill to record an audio announcement 801-M. Thus, both the reference parameters, i.e., telephone number, and audio announcement have been entered locally. The next time Bill Smith calls, a match will be detected between the CID data in signal 3,4 and the reference parameters making up a list 901-N which Bill himself input during his visit. As a result of this match, Bill's announcement 801-M is then output to the user.

In still another embodiment, the reference parameters and audio announcement are remotely input during an outgoing call 3,4 placed by the user of device 1 to a far-end caller.

For instance, suppose a user of device 1 places a call to Bill Smith. Some time during the telephone conversation, perhaps at the end, the user asks Bill to input an announcement. Bill agrees to do so. Next, the user then causes Bill's telephone number to be stored as a list 901-N. After this is done, Bill enters his announcement which is stored in memory 8.

Other devices may be used to enter the lists of reference parameters 901-N. For example, if a speed dial device or the like is connected to device 1, a user may instruct the device 1 to store all of the numbers stored as speed dial telephone numbers as lists 901-N. In addition, a user may program the device 1 so that it outputs an OGM message only to those far end callers whose telephone numbers were speed dial numbers. In general, the device 1 can be programmed to output OGM messages to any group of far end callers whose telephone numbers are stored as a list 901-N. The OGM message is intended to prompt the input of an announcement.

This is by no means an exhaustive list of examples of the present invention. Rather, the examples are used to point out the fact that the lists 901-N and announcements 801-M may be input locally or remotely by any number of means. The present invention works equally well under both scenarios.

Hopefully, when a caller is prompted to input an announcement, she will do so. If not, the output unit 8 may be further adapted to output a default audio signal 11,12 to a near end user when no caller announcement audio signal is input. This default audio signal may comprise an audible ring or the like.

The examples above are aimed at devices which make use of CID data. In an alternative embodiment of the present invention, ring cadence information, data or signals in incoming call 3,4 is compared to lists 901-N, and in particular, to ring cadence parameters of each list 901-N. Ring cadence is used to distinguish which phone number on a multi-numbered line is being called. For example, Bill Smith calls a house which has two phone numbers and two telephones associated with one physical telephone line. If Bill calls phone #1 the audio announcement is, "Jack, It's Bill Smith Calling". If Bill calls phone #2 the audio announcement is, "Jill, It's Bill Smith Calling". In one embodiment of the present invention, the output unit 8 is adapted to output at least one audio announcement signal associated with a list of reference parameters when the comparison of ring cadence signals in the incoming call 3,4 with lists 901-N results in a match. As before the announcement comprises the voice of a caller. It should be understood that the receiver 2 may comprise ring cadence detection capability for detecting the ring cadence data embedded in signal 3,4 or this capability may be supplied by another device connected to device 1. Such an embodiment allows the present invention to be used with existing devices which utilize ring cadence detection.

In certain circumstances, it is desirable to screen out unwanted incoming calls. Many times the CID data of an unwanted incoming call may be "blocked", i.e., the caller has deliberately encoded the CID data of incoming call 3,4 to prevent the device 1 from identifying the caller. The present invention comprises alternate embodiments which address this situation.

The lists 901-N may comprise additional parameters which help to identify when CID data has been so blocked. List or lists 901-N may comprise "null" reference parameters which, upon being compared to the encoded CID data in comparator results in a match. The output unit 8 is then further adapted to output an OGM message signal 11,12 stored in memory 8 associated with the null parameters that such callers will hear such as: "Sorry, we are not home to receive your message", etc. . . . In another embodiment of the invention, the output unit 8 is adapted to output an audio announcement associated with the null parameters to a near end user, e.g. "You have received a call from an unidentified caller".

Though the above examples have linked one list 901-N to one audio announcement or OGM message 801-M, the present invention is not so limited. Multiple announcements or OGMs may be linked to one list. For example, when Bill Smith calls, both an audio announcement 801-M directed at a near end user of device 1 and an OGM message 801-M directed at Bill Smith may be output from memory 8. Similarly, the same announcement or OGM message 801-M may be used by more than one list 901-N.

The audio signals or announcements 801-M output to a near end user may be output in place of, or in conjunction with a standard audible ring or another distinctive audible tone. To such end, the output unit 8 is adapted to output at least one audio signal or announcement between rings associated with the input signal and is further adapted to output the audio signal or announcement along with a distinctive tone or tones.

The announcement unit and memory 8, memory 9, comparator 5 and receiver/transmitter 2 depicted in FIG. 1 and mentioned above have been described in terms of the functions they perform. It should be understood that these "components", their connections and their interaction with one another may be realized by any number of physical designs known to those in the art, including designing these components as microscopic electronic devices.

Though the above explanation has used exemplary devices to explain the present invention, methods embodying the same steps as outlined above are with the scope of the present invention. It should be noted, however, that the present invention may be realized by methods using different sequences of events.

Figure 2A:
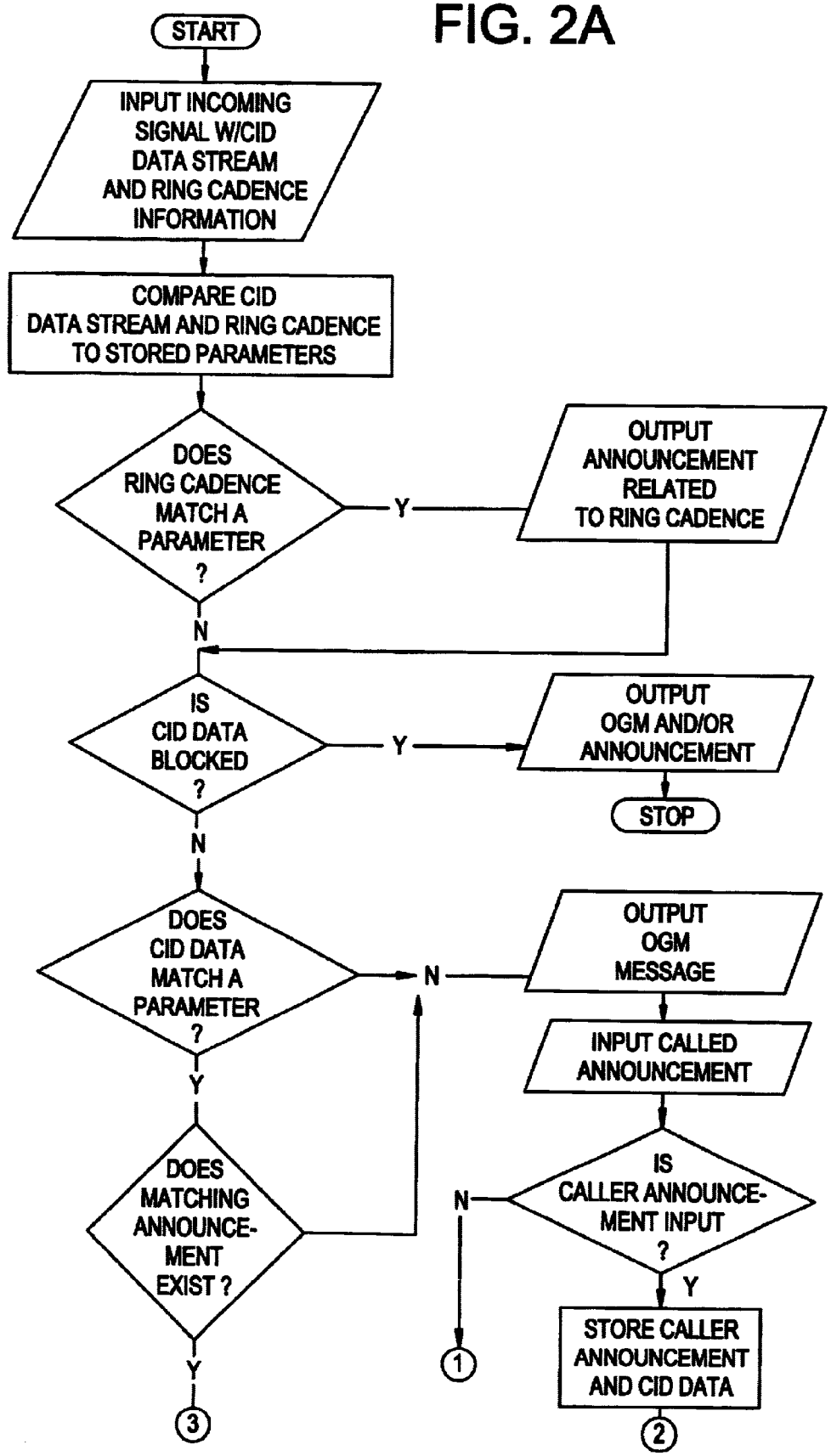
FIGS. 2A and 2B depict a flow diagram of methods for outputting audio signals to identify the source of incoming signals according to embodiments of the present invention.
Figure 2B:
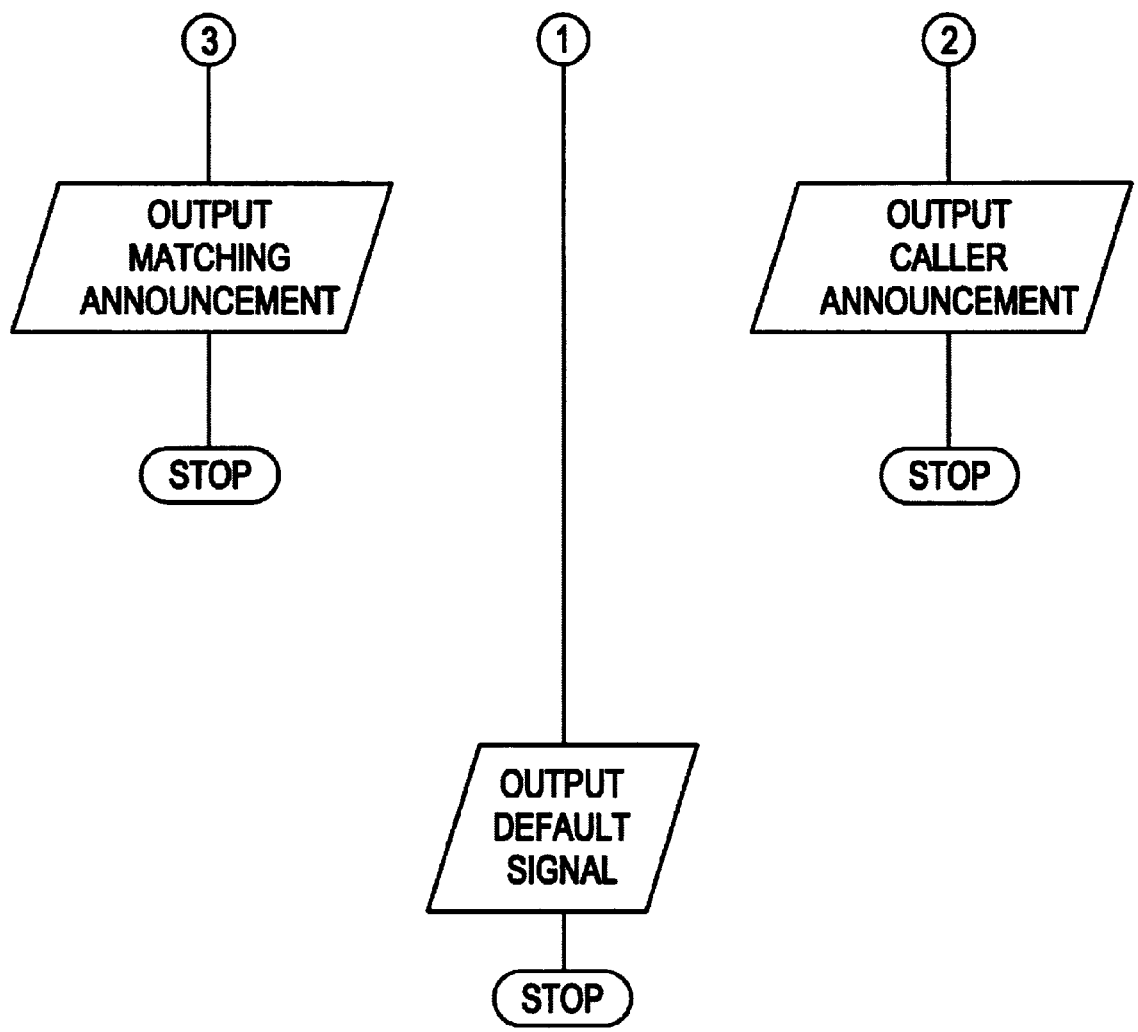

FIGS. 2A and 2B depict flow diagrams of some of the methods envisioned by the present invention.

By no means do FIGS. 2A and 2B cover all of the examples given above. Rather, they provide methodologies of some of the examples outlined above which then can be utilized to realize additional embodiments within the scope of the present invention.

Figure 3:
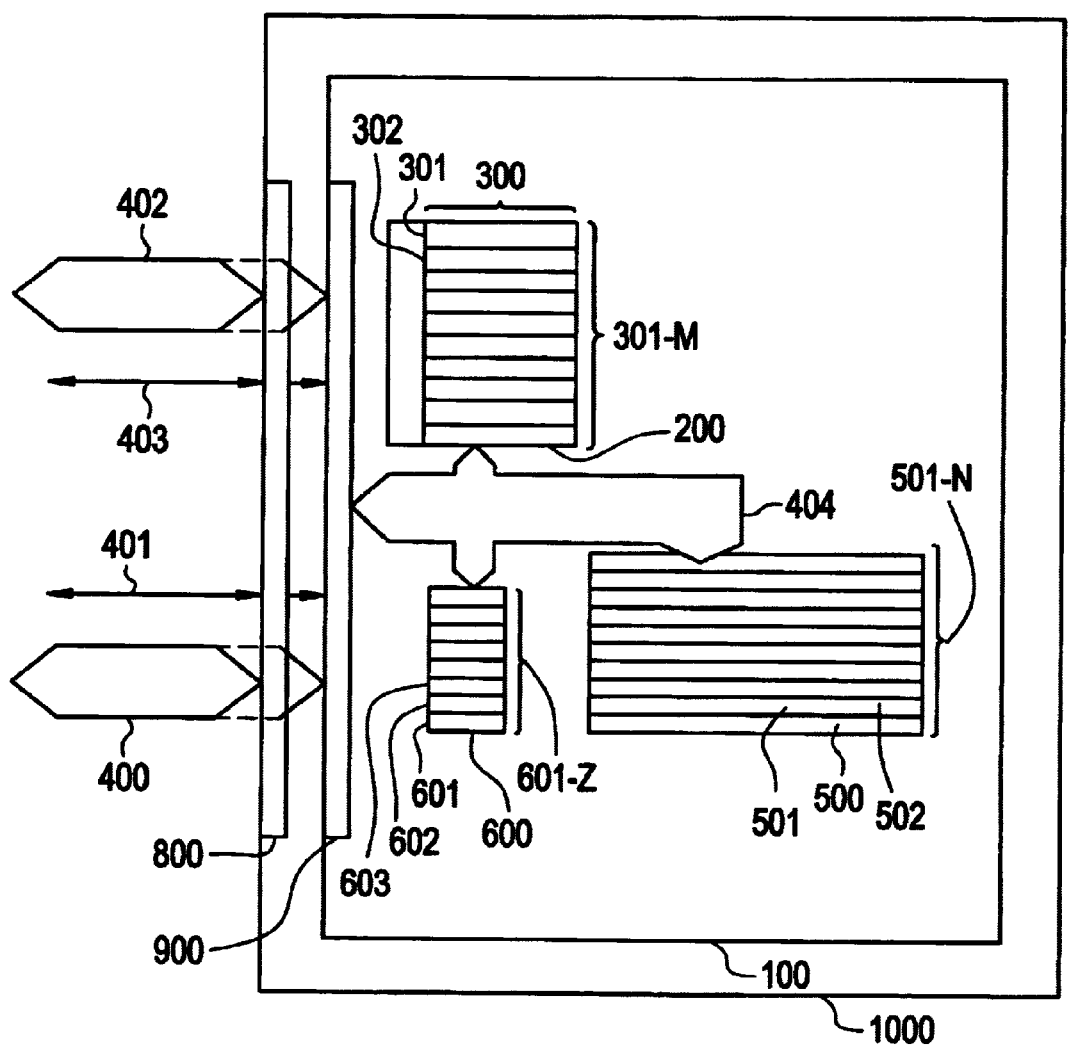
FIG. 3 depicts a programmed device for outputting audio signals to identify the source of incoming signals according to another embodiment of the present invention

FIG. 3 illustrates another embodiment of the present invention which comprises a programmed device 100 for outputting audio signals. This programmed device 100 may comprise a digital signal processor, microprocessor, a combination of memory devices or the like and is typically a part of a larger device or system such as a telephone, TAD or even a communications central office 1000.

The programmed device 100 comprises a program memory or memory means 200 for storing a program or program means 300. The program in turn comprises program code or code means 301-M for outputting audio signals. These signals may comprise audio announcements or greetings which help a near end user identify the source of incoming calls or signals 402,403 without having to be close to the device or system 1000. The incoming call or signal 402,403 may comprise an incoming telephone call and, in one embodiment, comprises CID data and/or ring cadence signals. In one embodiment, the program code means 301-M comprises program code means 301 for comparing an incoming signal 402,403 comprising CID data and/or ring cadence signals to lists 501-N of reference parameters.

The programmed device 100 additionally comprises program code means 302 for outputting at least one audio signal 601 associated with a list 501 of reference parameters via pathways 400,401 when the incoming signal and corresponding CID data or ring cadence signals match reference parameters which make up list 501. Thus, when a list of reference parameters 501-N matches either CID data or ring cadence signals an audio signal 601-Z is output. This audio signal is preferably an audio announcement.

To illustrate further consider the following example. Suppose the programmed device 100 is a part of a telephone 1000. The telephone 1000 receives an incoming call 402, 403. Upon receiving Bill's call, the program memory 200 selects program code means 301 which compares the incoming signal 402,403 to lists 501-N of reference parameters. If the comparison results in a match, the program memory 200 selects program code means 302 which selects the audio signal 601 associated with the list 501 and outputs that signal 601 to a near end user via pathway 400,401.

The lists 501-N may be stored in list memory 500 and the audio signals in audio signal memory 600. In one embodiment, the audio signals 601-Z comprise the voice or voices of far end callers. Thus, a near end user of device 100,1000 would hear an announcement 601 created by Bill Smith in Bill's voice.

The lists 501-N and announcements 601-M may be input locally or remotely using any one of the methods described before with regard to device 1 of FIG. 1.

Continuing, in one embodiment, the reference parameters which make up lists 501-N may be selected from a group of parameters consisting of name, telephone number and ring cadence. In another embodiment, the reference parameters comprise a combination of parameters selected from the group consisting of name, telephone number and ring cadence. The programmed device 100 may also utilize a list 502 of "null" parameters to determine whether CID data in an incoming signal 402,403 has been blocked or otherwise encoded.

As with the device 1 in FIG. 1, device 100 or 1000 may receive unwanted calls from time to time. To account for this probability, program code means 302 may further comprise program code or code means for outputting an OGM message signal 602 to a far end caller. This OGM message signal would advise the caller, for example, that the user: "Is not in to receive your call. Please leave a message". This OGM message signal may be in the user's voice. The OGM message signal 602 may also be stored in memory 600. This signal 602 is associated with a list 502 of null parameters stored in memory 500. Back tracking again, when the unwanted call 402,403 comprising "blocked" CID data is received by the device 100 or 1000, program code 301 compares this blocked CID data to lists 501-N, including list 502 which comprises the null parameters. The null parameters are designed to produce a match upon comparison with blocked CID data. In addition to outputting an OGM to a far end caller, it may also be desirable to output an announcement 601-Z of some kind to the near end user. Thus, another embodiment of the present invention comprises program code means 302 which further comprises program code or code means for outputting an audio announcement 603 associated with list 502 to a near end user.

Unless otherwise indicated, the audio announcements 601-Z may comprise recordings, signals related to recordings or data related to recordings of the voices of far end callers.

Programmed device 100 may control the output, e.g., timing, of the audio announcements 601-Z. In one embodiment, program code means 302 further comprises program code means for outputting the audio announcement signals 601-Z instead of a standard audible signal. Other embodiments comprise program code means 302 for outputting the audio announcement signals 601-Z between rings of the incoming signal 402,403 or along with a distinctive tone or tones.

The lists of reference parameters 501-N may be obtained from the CID data and ring cadence signals contained in incoming signals 402,403 or may be entered locally, as explained before.

In another embodiment, program code means 302 may comprise code means for outputting an OGM message signal 601-Z to prompt the input of a caller announcement audio signal when no audio signal 601-Z has been stored. In other words, though the reference parameters which match the incoming signal 402,403 have been stored, no audio announcement has yet been stored. The far end caller is then prompted to input a new announcement which will be stored in memory 600. This announcement may then be output to a near end user using additional program code means 302. The OGM message prompt will preferably ask the caller to leave an announcement in her own voice.

OGM messages or signals are also output when no match is found. Embedded CID data in a new signal 402,403 is then stored in a list 501-N. This scenario differs from the one just described above. Both scenarios recognize that no audio announcement has been stored. In the present example, however, CID data in the incoming signal 402,403 does not match any reference parameter of a list 501-N. When no match is found an OGM message signal is output using additional program code means 302. This OGM message is designed to prompt the far end caller to enter a caller announcement audio signal comprising the voice of the caller into memory 600 via pathways 402,403. Once received the announcement may be output to a near end user using program code means 302.

Even though the device 100 or 1000 prompts callers to enter announcements, some will refuse to do so. Another embodiment of the present invention addresses this set of circumstances. In such a case a default signal, which may simply comprise an audible ring or the like, may be output via pathways 400,401 using yet additional program code means 302.

The program memory 200, program 300, program code 301-M, list memory 500, lists 501-N, audio signal memory 600, and audio announcements/OGM messages 601-Z have been depicted as functional blocks in FIG. 3. These functional blocks may be realized by any number of designs well known to those in the art, including those designs which utilize microscopic electronic devices or circuitry.

In all of the embodiments of the invention, it is also desirable to allow the far end caller to chance the audio announcement she has previously recorded. DTMF key sequences may be sent as a part of incoming signal 3,4 or the like by the far end caller to allow her to record a new audio announcement or modify an existing one. To distinguish these DTMF signals from other DTMF signals, they may be referred to as "caller announcement DTMF signals". In one embodiment, the output unit 8 is further adapted to output the pre-recorded caller announcement audio signal via transmitter/receiver 2 and pathways 3,4 for play back to the far end caller upon reception of the caller announcement DTMF signals. The far end caller may choose to leave the announcement as is or redo the announcement. If the far end caller chooses to redo the announcement, a revised caller announcement audio signal may be sent via pathways 3,4 from the far end caller. The output unit 8 may also be adapted to, thereafter, output the revised caller audio announcement to a near end user via pathways 11,12 upon reception of the revised announcement. As before this revised caller announcement audio signal may be stored in a memory and in a preferred embodiment, the revised announcement comprises the voice of the far end caller.

It is to be understood that changes and variations may be made without departing from the spirit and scope of this invention as defined by the claims that follow.

We claim:

1. A device for outputting audio signals to identify the source of incoming signals comprising:

a receiver for receiving an incoming signal selected from at least the group consisting of a telephone, facsimile and email signal, wherein the telephone signal comprises ring cadence signals and CID data;

a comparator for comparing the incoming signal to lists of reference parameters comprising a combination of parameters selected from the group consisting of name, telephone number and ring cadence; and an output unit for outputting at least one audio signal consisting of the voice of a caller associated with one of the lists when the incoming signal matches the reference parameters of the list.

2. The device as in claim 1 wherein the reference parameters are selected from the group consisting of name, telephone number and ring cadence.

3. The device as in claim 1 wherein the reference parameters comprise null parameters indicating blocked CID data.

4. The device as in claim 3 wherein the output unit is adapted to output an OGM message signal associated with a list of null parameters when CID data is blocked.

5. The device as in claim 3 wherein the output unit is adapted to output an audio announcement associated with a list of null parameters when CID data is blocked.

6. The device as in claim 1 further comprising a list memory for storing the lists of reference parameters.

7. The device as in claim 1 wherein the output unit comprises an audio signal memory for storing the audio signals.

8. The device as in claim 1 wherein the output unit is adapted to output the at least one audio signal between rings in the input signal.

9. The device as in claim 1 wherein the output unit is adapted to output a distinct tone along with the at least one audio signal.

10. The device as in claim 1 wherein the output unit is adapted to output an OGM message signal to prompt the input of a caller announcement audio signal when the incoming signal does not match the reference parameters of the lists.

11. The device as in claim 10 wherein the output unit is adapted to output a caller announcement audio signal which has been input.

12. The device as in claim 11 further comprising an audio signal memory for storing the caller announcement audio signals.

13. The device as in claim 11 wherein the caller announcement audio signal comprises the voice of the caller.

14. The device as in claim 10 wherein the output unit is adapted to output a default audio signal when no caller announcement audio signal is input.

15. The device as in claim 14 wherein the default audio signal comprises an audible ring.

16. The device as in claim 1 wherein the output unit is adapted to output an OGM message signal to prompt the input of a caller announcement audio signal when no audio signal is associated with reference parameters which match the incoming signal.

17. The device as in claim 16 wherein the output unit is adapted to output the caller announcement audio signal which has been input.

18. The device as in claim 17 wherein the caller announcement audio signal comprises the voice of the caller.

19. The device as in claim 1 wherein the output unit is further adapted to output a caller announcement audio signal when the incoming signal comprises DTMF caller announcement signals.

20. The device as in claim 19 wherein the output unit is further adapted to output a revised caller announcement audio signal which has been input.

21. The device as in claim 20 further comprising an audio signal memory for storing the revised caller announcement audio signal.

22. The device as in claim 20 wherein the revised caller announcement audio signal comprises the voice of the caller.

23. The device as in claim 1 wherein the list of reference parameters is locally input into the device prior to receiving the incoming signal.

24. The device as in claim 1 wherein the audio signal is locally input into the device prior to receiving the incoming signal.

25. The device as in claim 24 wherein the audio signal is an audio announcement.

26. The device as in claim 1 wherein the list of reference parameters and audio signal are input into the device during a prior outgoing telephone call.

27. The device as in claim 1 wherein the lists of reference parameters are input from a speed dial device.

28. The device as in claim 1 wherein the device comprises a telephone.

29. The device as in claim 1 wherein the device comprises a TAD.

30. The device as in claim 1 wherein the device comprises a PBX.

31. The device as in claim 1 wherein the device comprises part of a communications central office.

32. A device for outputting audio signals to identify the source of incoming signals comprising:

receiving means for receiving an incoming signal selected from at least the group consisting of a telephone, facsimile and email signal, wherein the telephone signal comprises ring cadence signals and CID data;

comparison means for comparing the incoming signal to lists of reference parameters comprising a combination of parameters selected from the group consisting of name, telephone number and ring cadence; and output means for outputting at least one audio signal consisting of the voice of caller associated with one of the lists when the incoming signal matches the reference parameters of the list.

33. The device as in claim 32 wherein the reference parameters are selected from the group consisting of name, telephone number and ring cadence.

34. The device as in claim 32 wherein the reference parameters comprise null parameters indicating blocked CID data.

35. The device as in claim 34 wherein the output means is adapted to output an OGM message signal associated with a list of null parameters when CID data is blocked.

36. The device as in claim 34 wherein the output means is adapted to output an audio announcement associated with a list of null parameters when CID data is blocked.

37. The device as in claim 32 further comprising list memory means for storing the lists of reference parameters.

38. The device as in claim 32 wherein the output means comprises an audio signal memory for storing the audio signals.

39. The device as in claim 32 wherein the output means is adapted to output the at least one audio signal between rings in the input signal.

40. The device as in claim 32 wherein the output means is adapted to output a distinct tone along with the at least one audio signal.

41. The device as in claim 32 wherein the output means is adapted to output an OGM message signal to prompt the input of a caller announcement audio signal when the incoming signal does not match the reference parameters of the lists.

42. The device as in claim 41 wherein the output means is adapted to output a caller announcement audio signal which has been input.

43. The device as in claim 42 further comprising audio signal memory means for storing the caller announcement audio signals.

44. The device as in claim 42 wherein the caller announcement audio signal comprises the voice of the caller.

45. The device as in claim 41 wherein the output means is adapted to output a default audio signal when no caller announcement audio signal is input.

46. The device as in claim 45 wherein the default audio signal comprises an audible ring.

47. The device as in claim 32 wherein the output means is adapted to output an OGM message signal to prompt the input of a caller announcement audio signal when no audio signal is associated with reference parameters which match the incoming signal.

48. The device as in claim 47 wherein the output means is adapted to output the caller announcement audio signal which has been input.

49. The device as in claim 48 wherein the caller announcement audio signal comprises the voice of the caller.

50. The device as in claim 32 wherein the output means is further adapted to output a caller announcement audio signal when the incoming signal comprises DTMF caller announcement signals.

51. The device as in claim 50 wherein the output means is further adapted to output a revised caller announcement audio signal which has been input.

52. The device as in claim 51 further comprising audio signal memory means for storing the revised caller announcement audio signal.

53. The device as in claim 51 wherein the revised caller announcement audio signal comprises the voice of the caller.

54. The device as in claim 32 wherein the list of reference parameters is locally input into the device prior to receiving the incoming signal.

55. The device as in claim 32 wherein the audio signal is locally input into the device prior to receiving the incoming signal.

56. The device as in claim 55 wherein the audio signal is an audio announcement.

57. The device as in claim 32 wherein the list of reference parameters and audio signal are input into the device during a prior outgoing telephone call.

58. The device as in claim 32 wherein the lists of reference parameters are input from a speed dial device.

59. The device as in claim 32 wherein the device comprises a telephone.

60. The device as in claim 32 wherein the device comprises a TAD.

61. The device as in claim 32 wherein the device comprises a PBX.

62. The device as in claim 32 wherein the device comprises part of a communications central office.

63. A programmed device comprising:
program memory means for storing a program, the program comprising:
program code means for comparing the incoming signal selected from at least the group consisting of a telephone, facsimile and email signal, wherein the telephone signal comprises ring cadence signals and CID data to lists of reference parameters comprising a combination of parameters selected from the group consisting of name, telephone number and ring cadence; and program code means for outputting at least one audio signal consisting of the voice of a caller associated with one of the lists when the incoming signal matches the reference parameters of the list.

64. The programmed device as in claim 63 wherein the reference parameters are selected from the group consisting of name, telephone number and ring cadence.

65. The programmed device as in claim 63 wherein the reference parameters comprise null parameters indicating blocked CID data.

66. The programmed device as in claim 65 wherein the program code for outputting further comprises program code for outputting an OGM message signal associated with a list of null parameters when CID data is blocked.

67. The programmed device as in claim 65 wherein the program code for outputting further comprises program code for outputting an audio signal associated with a list of null parameters when CID data is blocked.

68. The programmed device as in claim 63 further comprising a list memory for storing the lists of reference parameters.

69. The programmed device as in claim 63 further comprising an audio signal memory for storing the audio signals.

70. The programmed device as in claim 63 wherein the audio signals comprise audio announcements, the audio announcements comprising the voices of callers.

71. The programmed device as in claim 63 wherein the program code means for outputting further comprises program code means for outputting the at least one audio signal between rings in the incoming signal.

72. The programmed device as in claim 63 wherein the program code means for outputting further comprises program code means for outputting the at least one audio signal along with a distinct tone.

73. The programmed device as in claim 63 wherein the program code means for outputting further comprises program code means for outputting an OGM message signal to prompt the input of a caller announcement audio signal when the incoming signal does not match the reference parameters of the lists.

74. The programmed device as in claim 72 wherein the program code means for outputting further comprises program code means for outputting a caller announcement audio signal which has been input.

75. The programmed device as in claim 74 further comprising an audio signal memory for storing the caller announcement audio signals.

76. The programmed device as in claim 75 wherein the caller announcement audio signal comprises the voice of the caller.

77. The programmed device as in claim 73 wherein the program code means for outputting further comprises program code means for outputting a default audio signal when no caller announcement audio signal is input.

78. The programmed device as in claim 77 wherein the default signal comprises an audible ring.

79. The programmed device as in claim 63 wherein the program code means for outputting further comprises program code means for outputting an OGM message signal to prompt the input of a caller announcement audio signal when no audio signal is associated with reference parameters which match the incoming signal.

80. The programmed device as in claim 79 wherein the program code means for outputting further comprises program code means for outputting the caller announcement audio signal which has been input.

81. The programmed device as in claim 80 wherein the caller announcement audio signal comprises the voice of the caller.

82. The programmed device as in claim 63 wherein the program code means for outputting further comprises program code means for outputting a caller announcement audio signal when the incoming signal comprises DTMF caller announcement signals.

83. The programmed device as in claim 82 wherein the program code means for outputting further comprises program code for outputting a revised caller announcement audio signal which has been input.

84. The programmed device as in claim 83 further comprising an audio signal memory for storing the revised caller announcement audio signal.

85. The programmed device as in claim 83 wherein the revised caller announcement audio signal comprises the voice of the caller.

86. The programmed device as in claim 63 wherein the list of reference parameters is locally input prior to receiving the incoming signal.

87. The programmed device as in claim 63 wherein the audio signal is locally input prior to receiving the incoming signal.

88. The programmed device as in claim 87 wherein the audio signal is an audio announcement.

89. The programmed device as in claim 63 wherein the list of reference parameters and audio signal are input during a prior outgoing telephone call.

90. The programmed device as in claim 63 wherein the lists of reference parameters are input from a speed dial device.

91. The programmed device as in claim 63 wherein the programmed device comprises a telephone.

92. The programmed device as in claim 63 wherein the programmed device comprises a TAD.

93. The programmed device as in claim 63 wherein the programmed device comprises a PBX.

94. The programmed device as in claim 63 wherein the programmed device comprises part of a communications central office.

95. A method for outputting audio signals from a communications device to identify the source of incoming signals comprising:
receiving an incoming signal selected from at least the group consisting of a telephone, facsimile and email signal, wherein the telephone signal comprises ring cadence signals and CID data;
comparing the incoming signal to lists of reference parameters comprising a combination of parameters selected from the group consisting of name, telephone number and ring cadence; and
outputting at least one audio signal consisting of the voice of a caller associated with one of the lists when the incoming signal matches the reference parameters of list.

96. The method as in claim 95 wherein the reference parameters are selected from the group consisting of name, telephone number and ring cadence.

97. The method as in claim 95 wherein the reference parameters comprise null parameters indicating blocked CID data.

98. The method as in claim 97 further comprising outputting an OGM message signal associated with a list of null parameters when CID data is blocked.

99. The method as in claim 97 further comprising outputting an audio announcement associated with a list of null parameters when CID data is blocked.

100. The method as in claim 95 further comprising storing the lists of reference parameters.

101. The method as in claim 95 further comprising storing the audio signals.

102. The method as in claim 95 further comprising outputting the at least one audio signal between rings in the input signal.

103. The method as in claim 95 further comprising outputting a distinct tone along with the at least one audio signal.

104. The method as in claim 80 further comprising outputting an OGM message signal to prompt the input of a caller announcement audio signal when the incoming signal does not match the reference parameters of the lists.

105. The method as in claim 104 further comprising outputting a caller announcement audio signal which has been input.

106. The method as in claim 105 further comprising storing the caller announcement audio signals.

107. The method as in claim 106 wherein the caller announcement audio signal comprises the voice of the caller.

108. The method as in claim 104 further comprising outputting a default audio signal when no caller announcement audio signal is input.

109. The method as in claim 108 wherein the default audio signal comprises an audible ring.

110. The method as in claim 95 further comprising outputting an OGM message signal to prompt the input of a caller announcement audio signal when no audio signal is associated with reference parameters which match the incoming signal.

111. The method as in claim 95 further comprising outputting the caller announcement audio signal which has been input.

112. The method as in claim 95 wherein the caller announcement audio signal comprises the voice of the caller.

113. The method as in claim 95 further comprising outputting a caller announcement audio signal when the incoming signal comprises DTMF caller announcement signals.

114. The method as in claim 113 further comprising outputting a revised caller announcement audio signal which has been input.

115. The method as in claim 114 further comprising storing the revised caller announcement audio signal.

116. The method as in claim 114 wherein the revised caller announcement audio signal comprises the voice of the caller.

117. The method as in claim 95 further comprising locally inputting the reference parameters prior to receiving the incoming signal.

118. The method as in claim 95 further comprising locally inputting the audio signal prior to receiving the incoming signal.

119. The method as in claim 118 wherein the audio signal is an audio announcement.

120. The method as in claim 95 further comprising inputting the list of reference parameters and audio signal during a prior outgoing telephone call.

121. The method as in claim 95 further comprising locally inputting the lists of reference parameters from a speed dial device.

122. The method as in claim 95 wherein the communications device comprises a telephone.

123. The method as in claim 95 wherein the communications device comprises a TAD.

124. The method as in claim 95 wherein the device comprises a PBX.

125. The method as in claim 95 wherein the communications device comprises part of a communications central office.

126. A device for outputting audio signals to identify the source of incoming signals comprising:
- a receiver for receiving an incoming signal;
- a comparator for comparing the incoming signal to lists of reference parameters;
- an output unit for outputting at least one audio signal associated with a list of reference parameters when the incoming signal matches the reference parameters of the list, wherein the list of reference parameters and audio signal are input into the device during a prior outgoing telephone call.

127. A device for outputting audio signals to identify the source of incoming signals comprising:
- receiving means for receiving an incoming signal;
- comparison means for comparing the incoming signal to lists of reference parameters; and
- output means for outputting at least one audio signal associated with a list of reference parameters when the incoming signal matches the reference parameters of the list, wherein the reference parameters comprise a combination of parameters selected from the group consisting of name, telephone number and ring cadence.

128. A device for outputting audio signals to identify the source of incoming signals comprising:
- receiving means for receiving an incoming signal;
- comparison means for comparing the incoming signal to lists of reference parameters; and
- output means for outputting at least one audio signal associated with a list of reference parameters when the incoming signal matches the reference parameters of the list, wherein the list of reference parameters and audio signal are input into the device during a prior outgoing telephone call.

129. A programmed device for outputting audio signals to identify the source of incoming signals comprising a program memory for storing a program, the program comprising:
- program code means for comparing the incoming signal to lists of reference parameters; and
- program code means for outputting at least one audio signal associated with a list of reference parameters when the incoming signal matches the reference parameters of the list, wherein the list of reference parameters and audio signal are input during a prior outgoing telephone call.

130. A device for outputting audio signals to identify the source of incoming signals comprising:
- receiving an incoming signal;
- comparing the incoming signal to lists of reference parameters;
- outputting at least one audio signal associated with a list of reference parameters when the incoming signal matches the reference parameters of the list; and
- inputting the list of reference parameters and audio signal during a prior outgoing telephone call.

* * * * *